US009622217B2

(12) United States Patent
Xu et al.

(10) Patent No.: US 9,622,217 B2
(45) Date of Patent: Apr. 11, 2017

(54) UPLINK/DOWNLINK CONFIGURATION METHOD AND DEVICE IN SYSTEM USING TIME DIVISION DUPLEX COMMUNICATION MODE

(71) Applicant: China Academy of Telecommunications Technology, Beijing (CN)

(72) Inventors: Jing Xu, Beijing (CN); Xueming Pan, Beijing (CN); Zukang Shen, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 79 days.

(21) Appl. No.: 14/398,974

(22) PCT Filed: Mar. 5, 2013

(86) PCT No.: PCT/CN2013/072189

§ 371 (c)(1),
(2) Date: Nov. 4, 2014

(87) PCT Pub. No.: WO2013/163905

PCT Pub. Date: Nov. 7, 2013

(65) Prior Publication Data

US 2015/0117273 A1    Apr. 30, 2015

(30) Foreign Application Priority Data

May 4, 2012 (CN) .......................... 2012 1 0137053

(51) Int. Cl.
*H04W 72/04* (2009.01)
*H04L 5/14* (2006.01)
(Continued)

(52) U.S. Cl.
CPC ........... *H04W 72/04* (2013.01); *H04L 5/0073* (2013.01); *H04L 5/0092* (2013.01); *H04L 5/14* (2013.01);
(Continued)

(58) Field of Classification Search
None
See application file for complete search history.

(56) References Cited

U.S. PATENT DOCUMENTS

2012/0082140 A1    4/2012 Lin et al.
2013/0272170 A1*  10/2013 Chatterjee ............. H04W 28/02
                                                 370/280
(Continued)

FOREIGN PATENT DOCUMENTS

CN    101431362 A    5/2009
CN    101567713 A    10/2009
(Continued)

OTHER PUBLICATIONS

International Search Report for PCT/CN2013/072189.

*Primary Examiner* — Gary Mui
(74) *Attorney, Agent, or Firm* — Kilpatrick Townsend & Stockton LLP

(57) ABSTRACT

Disclosed are an uplink-downlink configuration method and device in a system using a time division duplex communication mode, which relate to the technical field of wireless communications and are used for optimizing a configuration solution of an uplink/downlink subframe allocation manner. In the present invention, the method comprises: a central node device receiving reference information which is used for configuring an uplink-downlink configuration and sent by a transmission node device managed by the central node device; the central node device configuring the uplink-downlink configuration according to the received reference information; and the central node device sending the infor- (Continued)

mation about the configured uplink-downlink configuration to the corresponding transmission node device or to the corresponding transmission node device and a terminal. The configuration solution of the uplink-downlink configuration in the present invention is more optimized.

11 Claims, 10 Drawing Sheets

(51) Int. Cl.
    *H04L 5/00*         (2006.01)
    *H04W 28/16*      (2009.01)

(52) U.S. Cl.
    CPC ....... *H04L 5/1469* (2013.01); *H04W 72/0446* (2013.01); *H04W 28/16* (2013.01)

(56) References Cited

U.S. PATENT DOCUMENTS

| | | | |
|---|---|---|---|
| 2015/0092628 A1* | 4/2015 | Zhao | H04L 1/1861 370/280 |
| 2016/0007232 A1* | 1/2016 | Wang | H04B 7/0456 370/280 |

FOREIGN PATENT DOCUMENTS

| | | |
|---|---|---|
| CN | 102420682 A | 4/2012 |
| WO | 2012112858 A1 | 8/2012 |

* cited by examiner

--Prior Art--

--Prior Art--

--Prior Art--

--Prior Art--

UPLINK/DOWNLINK CONFIGURATION METHOD AND DEVICE IN SYSTEM USING TIME DIVISION DUPLEX COMMUNICATION MODE

The present application is a US National Stage of International Application No. PCT/CN2013/072189, filed Mar. 5, 2013, designating the United States, and claiming the benefit of Chinese Patent Application No. 201210137053.9, filed with the Chinese Patent Office on May 4, 2012 and entitled "An uplink-downlink configuration method and device in a system in a time division duplex communication mode", which are hereby incorporated by reference in their entireties.

FIELD

The present invention relates to the field of wireless communications and particularly to an uplink-downlink configuration method and device in a system in a time division duplex communication mode.

BACKGROUND

For general duplex schemes adopted in a cellular system, a Time Division Duplex (TDD) mode refers to transmission of uplink/downlink signals in the uplink and the downlink in different periods of time over the same operating frequency band, where there is a Guard Period (GP) between the uplink and the downlink; and a Frequency Division Duplex (FDD) mode refers to possible transmission of uplink/downlink signals in the uplink and the downlink concurrently over different carrier carriers in different operating frequency bands, where there is a Guard Band (GB) between the uplink and the downlink, as illustrated in FIG. 1, where T represents transmission and R represents reception.

A frame structure of a Time Division-Long Term Evolution (TD-LTE) system is somewhat complicated, as illustrated in FIG. 2, where a radio frame with a length of 10 ms includes 10 sub-frames in total including special sub-frames and normal sub-frames, and each sub-frame is 1 ms in length. The special sub-frame includes three time slots: a Downlink Pilot Time Slot (DwPTS), a GP and an Uplink Pilot Time Slot (UpPTS). The normal sub-frames include uplink sub-frames and downlink sub-frames for transmitting uplink/downlink control signaling, traffic data, etc. Particularly a radio frame can be configured with two special sub-frames (in the sub-frame #1 and the sub-frame #6 respectively) or can be configured with one special sub-frame (in the sub-frame #1). The sub-frame #0 and the sub-frame #5, and the DwPTS time slot(s) in the special sub-frame(s) are usually used for downlink transmission, the sub-frame #2 and the UpPTS time slot(s) in among the sub-frame(s) are usually used for uplink transmission, and the remaining sub-frames can be configured for uplink transmission or downlink transmission as needed.

In the TD-LIE system, the total length of three time slots DwPTS, GP and UpPTS in a special sub-frame is 1 ms, and different configuration conditions for the allocated lengths of these three time slots are supported, as depicted in Table 1, where there is a temporal length unit of $T_s$ with $T_s=1/(15000 \times 2048)$ second.

TABLE 1

| Configuration No. | Normal CP | | | Extended CP | | |
|---|---|---|---|---|---|---|
| | DwPTS | GP | UpPTS | DwPTS | GP | UpPTS |
| 0 | $6592 \cdot T_s$ | $21936 \cdot T_s$ | $2192 \cdot T_s$ | $7680 \cdot T_s$ | $20480 \cdot T_s$ | $2560 \cdot T_s$ |
| 1 | $19760 \cdot T_s$ | $8768 \cdot T_s$ | | $20480 \cdot T_s$ | $7680 \cdot T_s$ | |
| 2 | $21952 \cdot T_s$ | $6576 \cdot T_s$ | | $23040 \cdot T_s$ | $5120 \cdot T_s$ | |
| 3 | $24144 \cdot T_s$ | $4384 \cdot T_s$ | | $25600 \cdot T_s$ | $2560 \cdot T_s$ | |
| 4 | $26336 \cdot T_s$ | $2192 \cdot T_s$ | | $7680 \cdot T_s$ | $17920 \cdot T_s$ | $5120 \cdot T_s$ |
| 5 | $6592 \cdot T_s$ | $19744 \cdot T_s$ | $4384 \cdot T_s$ | $20480 \cdot T_s$ | $5120 \cdot T_s$ | |
| 6 | $19760 \cdot T_s$ | $6576 \cdot T_s$ | | $23040 \cdot T_s$ | $2560 \cdot T_s$ | |
| 7 | $21952 \cdot T_s$ | $4384 \cdot T_s$ | | — | — | — |
| 8 | $24144 \cdot T_s$ | $2192 \cdot T_s$ | | — | — | — |

Seven different allocation schemes of uplink/downlink sub-frames are supported in the TD-LTE system with their particular configuration parameters as depicted in Table 2, where D represents downlink transmission, U represents uplink transmission, and S represents a special sub-frame including three time slots DwPTS, GP and UpPTS.

TABLE 2

| Config-uration No. | Switch periodicity | Sub-frame No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The configuration of special sub-frame and the allocation scheme of uplink/downlink sub-frames above are broadcasted to all of users in a cell in System Information (SI).

As can be apparent from the description above, a change to the two frame configuration parameters above by a system information change is supported in the TD-LIE system, but this change further necessitates procedures of paging, newly fetching system information, etc., and there are several ambiguous issues before and after the change, for example, resulting in an adverse influence upon Hybrid Automatic Repeated Request (HARQ) operations and scheduling, etc. If the frame configuration were changed frequently, then the performance of the system might have been seriously degraded. Moreover the minimum frame configuration change periodicity of 640 ms supported in the TD-LTE system has not yet accommodated a dynamically changing demand for a service.

In view of this, a dynamic solution to allocation of uplink/downlink sub-frames has been proposed as follows:

In a specific period of time, there are four preset types of sub-frames including sub-frames always used for downlink transmission, sub-frames always used for uplink transmission, and sub-frames flexibly allocated for uplink or downlink transmission. The period of time is one radio frame, where the sub-frame #0 and the sub-frame #5 are always-downlink sub-frames, the sub-frame #2 and the sub-frame #7 are always-uplink sub-frames, the sub-frame #1 and the sub-frame #6 are special sub-frames (or can be always-downlink sub-frames), and the remaining sub-frames (the sub-frame #3, the sub-frame #4, the sub-frame #8 and the sub-frame #9) are sub-frames allocated flexibly for uplink or downlink transmission. The last type of sub-frames can be configured dynamically by a base station in view of a real-time traffic demand and a real-time channel condition to accommodate a dynamic change in demand for a service.

In summary, a method of configuring dynamically TDD sub-frames has been suggested in the disclosed solution of the prior art. In a real system, if different cells are preset separately with different uplink-downlink configurations, then inter-eNB or/and inter-UE interference may occur with neighboring cells, as illustrated in FIG. 3, where an L-UE represents a user equipment which belong to a low-power node. It shall be noted that the neighboring cells here may be geographically neighboring cells operating over the same frequency carrier, a illustrated in FIG. 3, or geographically overlapping or neighboring cells operating over adjacent frequency carriers, as illustrated in FIG. 4. Also the neighboring cells here may be cells deployed at the same layer (e.g., macro cells) or can be cells deployed at different layers (a macro cell, a pico cell, a femto cell, etc.) Thus the solution to configure uplink-downlink configurations dynamically suggested in the prior art has not addressed the accompanying problem of inter-eNB or/and inter-E interference, especially for inter-eNB interference, thus degrading the performance of the system.

SUMMARY

Embodiments of the invention provide an plink-downlink configuration method and device in a system in a time division duplex communication mode so as to optimize the configuration solution to allocation of uplink/downlink sub-frames.

An uplink-downlink configuration method in a system in a Time Division Duplex (TDD) communication triode includes:

a central node device receiving a reference information, for configuring an uplink-downlink configuration, transmitted by a network node device managed by the central node device;

the central node device configuring the uplink-downlink configuration according to the received reference information; and the central node device transmitting information about the uplink-downlink configuration configured by the central node device to the corresponding network node device or to the corresponding network node device and a user equipment.

An uplink-downlink configuration method in a system in a Time Division Duplex (TDD) communication mode includes:

a network node device obtaining a reference information for configuring an uplink-downlink configuration;

the network node device transmitting the reference information to a central node device managing the network node device; and the network node device receiving information, about the uplink-downlink configuration, transmitted by the central node device.

A central node device includes:

a reception unit configured to receive a reference information, for configuring an uplink-downlink configuration, transmitted by a network node device managed by the central node device;

a configuration unit configured to configure the uplink-downlink configuration according to the received reference information; and a transmission unit configured to transmit information about the uplink-downlink configuration configured by the configuration unit to the corresponding network node device or to the corresponding network node device and a user equipment.

A network node device includes:

an obtainment unit configured to obtain a reference information for configuring an uplink-downlink configuration;

a transmission unit configured to transmit the reference information to a central node device managing the network node device; and a reception unit configured to receive information, about the uplink-downlink configuration, transmitted by the central node device.

In the present solution, a central node device configures an uplink-downlink configuration according to reference information transmitted by a network node device and transmits information about the uplink-downlink configuration to the corresponding network node device or to the corresponding network node device and a user equipment, and as compared with the prior art in which a base station configures an uplink-downlink configuration dynamically based upon a real-time demand for a service or/and a real-time channel condition, the central node device can further optimize a configuration solution to more appropriate allocation of uplink/downlink sub-frames according to the reference information transmitted by the network node device(s) managed by the central node device in the present solution.

DETAILED DESCRIPTION

In order to provide an optimized configuration solution to allocation of uplink/downlink sub-frames, an embodiment of the invention provides an uplink-downlink configuration method in a system in a TDD communication mode, and in the present method, a central node device configures an uplink-downlink configuration according to reference information transmitted by a network node device and transmits information about the uplink-downlink configuration configured or selected by the central node device to the corresponding network node device or to the corresponding network node device and a user equipment. The uplink-downlink configuration can be one of the seven uplink-downlink configurations in Table 2.

Figure 5:
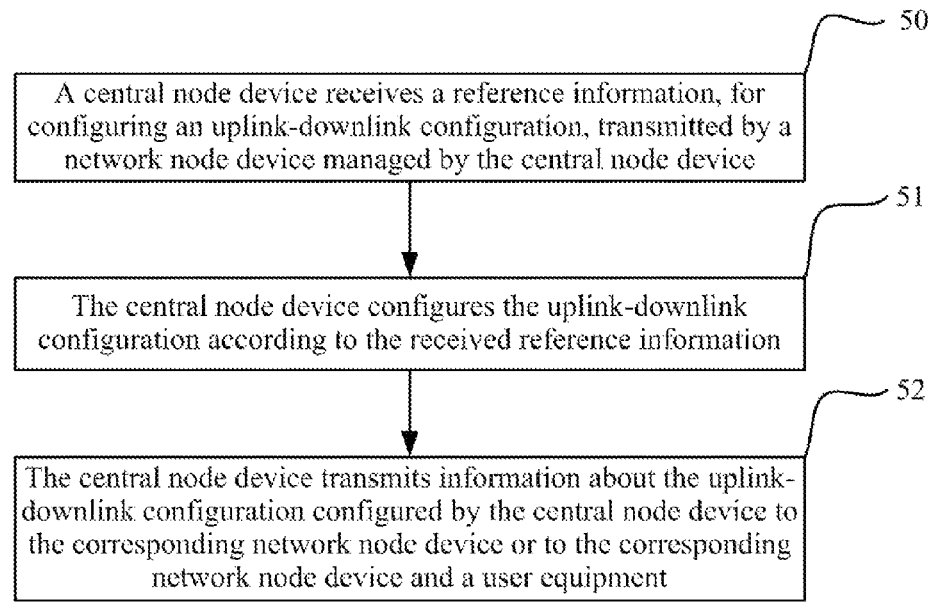
FIG. 5 is a schematic flow chart of a method according to an embodiment of the invention.

Referring to FIG. 5, an uplink-downlink configuration method in a system in a TDD communication mode at the central node device side according to an embodiment of the invention includes the following steps:

In the operation 50, a central node device receives reference information, for configuring an uplink-downlink configuration, transmitted by a network node device managed by the central node device;

In the operation 51, the central node device configures the uplink-downlink configuration according to the received reference information; and In the operation 52, the central node device transmits information about the configured uplink-downlink configuration to the corresponding network node device or to the corresponding network node device and a user equipment.

Figure 1:
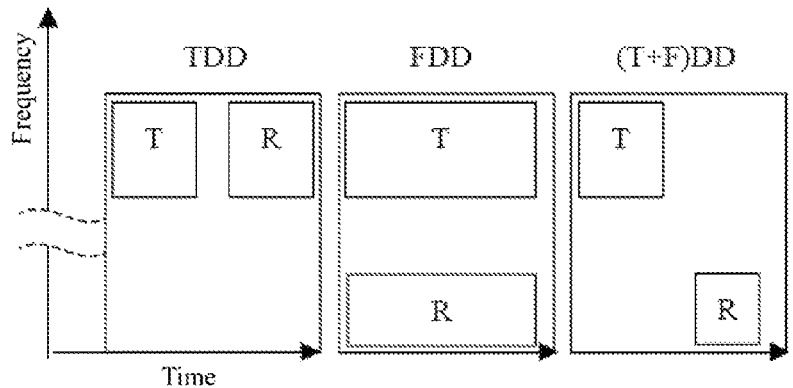
FIG. 1 is a schematic diagram of the time-frequency relationship in the general duplex schemes in the prior art.
Figure 2:
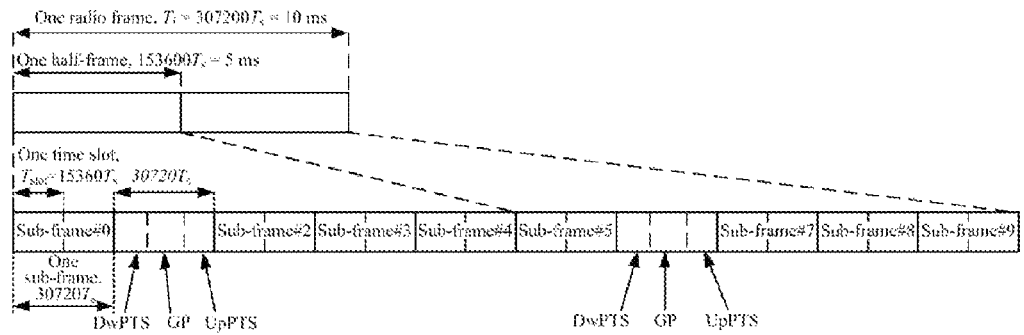
FIG. 2 is a schematic structural diagram of a frame in the TD-LTE system in the prior art.
Figure 3:
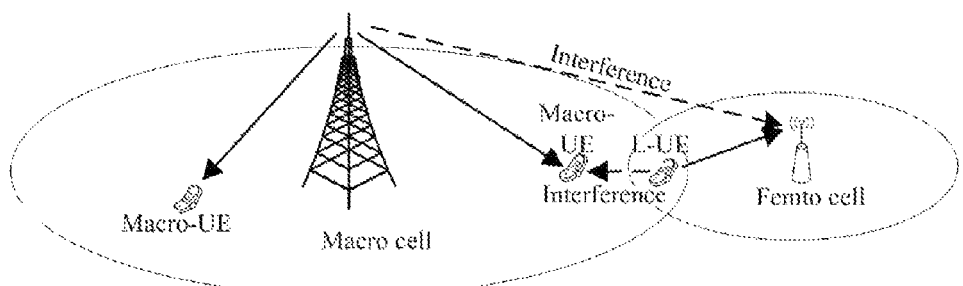
FIG. 3 is a schematic diagram of inter-eNB interference in the prior art.
Figure 4:
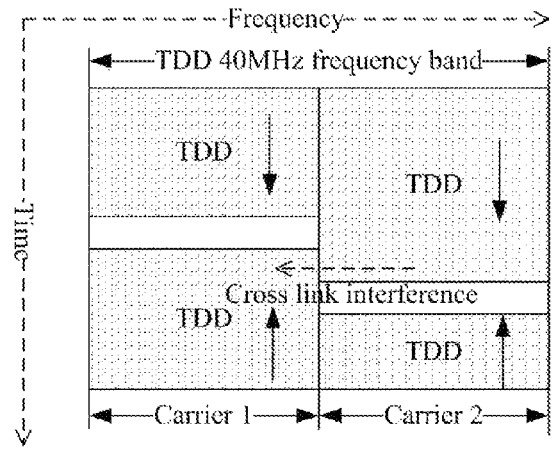
FIG. 4 is a schematic diagram of setting of different uplink-downlink configurations over adjacent frequency carriers in the prior art.

Particularly the reference information, for configuring an uplink-downlink configuration, transmitted by the network node device can include one or any combination of the following information:

An amount of data to be transmitted in the uplink and the amount of data to be transmitted in the downlink of the network node device and/or the user equipment;

An amount of data to be transmitted in the uplink, the amount of data to be transmitted in the downlink, the amount of data transmitted in the uplink and the amount of data transmitted in the downlink of the network node device and/or the user equipment;

An utilization ratio of uplink subframes and the utilization ratio of downlink subframes (including downlink subframe and DWPTS in special subframe) of the network node device and/or the user equipment, where the utilization ratio of uplink sub-frames refers to the ratio of the number of uplink sub-frames transmitting data and/or the user equipment to transmit uplink data to the number of uplink sub-frames allocated to the network node device and/or the user equipment; and the utilization ratio of downlink sub-frames refers to the ratio of the number of downlink sub-frames used by the network node device and/or the user equipment to transmit downlink data to the number of downlink sub-frames allocated to the network node device and/or the user equipment;

A ratio of needed uplink and downlink sub-frames of the network node device and/or the user equipment; and A information of uplink-downlink configuration used or to be used by network node device and/or the user equipment, where information of plink-downlink configuration used or to be used by network node device and/or the user equipment could be represented by uplink-downlink configuration Index in FIG. 2 or other information from which an uplink-downlink configuration can be determined.

Particularly each central node device manages at least one network node device, and the network node device(s) managed by each central node device is(are) divided into at least one cluster, each of which includes at least one network node device, and furthermore at least one user equipment may be covered by each network node and there is a user equipment covered by a network node, a cluster to which the user equipment belongs is a cluster to which the network node serving the user equipment belongs; and correspondingly in the fifth operation1, the central node device can configure an uplink-downlink configuration for the network node device served by the central node device according to the received reference information particularly as follows:

For each cluster served by the central node device, the central node device determines an uplink-downlink configuration according to a reference information, for configuring an uplink-downlink configuration, transmitted by a network node device in the cluster and configures respective network node devices in the cluster with the determined uplink-downlink configuration.

Particularly the central node device can determine an uplink-downlink configuration according to reference information, for configuring an uplink-downlink configuration, transmitted by a network node device in the cluster in either of the following two implementations:

Firstly the central node device determines an uplink-downlink configuration according to reference information, for configuring an uplink-downlink configuration, transmitted by one network node device in the cluster; and Secondly the central node device counts reference information, for configuring an uplink-downlink configuration, transmitted by the respective network node device in the cluster and determines an uplink-downlink configuration from a result of counting.

Furthermore network node devices managed by the central node device can be divided in advance into at least one cluster, and at this time the reference information transmitted by the network node device further includes information about a cluster to which the network node device belongs so that the central node device can determine from the information the cluster to which the network node device belongs; or Alternatively the central node device can divide the network node devices managed by the central node device into at least one cluster upon reception of the reference information transmitted by the network node devices, and at this time the reference information transmitted by the network node device further includes geographical information of the network node device, and the central node device can determine from the information interference conditions between the respective network node devices and can further divide them into clusters dependent upon the interference conditions.

Preferably, in order to avoid the problem of inter-eNB or/and inter-UE interference, especially for inter-eNB interference, such a clustering principle can apply that network node devices geographically neighboring and operating over the same frequency carrier are divided into the same cluster, that is, network node devices in the same cluster are geographically neighboring and operate over the same frequency carrier; or network node devices geographically overlapping or neighboring and operating over the same frequency carrier are divided into the same cluster, that is, network node devices in the same cluster are geographically overlapping or neighboring and operate over the same TDD carrier.

Furthermore when there are a plurality of central node device in a system, after the fifth operation1 and before the fifth operation2, one of the central node devices can interact with the other neighboring central node devices to obtain information about uplink-downlink configurations configured by the other adjacent central node devices; and adjust an uplink-downlink configuration configured by the central node device according to the obtained information; and correspondingly in the fifth operation1, the central node device transmits the information about the uplink-downlink configuration configured by the central node device to the corresponding network node device or to the corresponding network node device and the user equipment and particularly transmits the information about the adjusted uplink-downlink configuration to the corresponding network node device or to the corresponding network node device and the user equipment.

Preferably in the case that network node devices in the same cluster are managed by a plurality of central node devices, that is, there is an overlapping cluster, one of the central node devices can adjust an uplink-downlink configuration configured by the present central node device for the network node devices in the overlapping cluster according to uplink-downlink configurations configured by the other adjacent central node devices for the network node devices in the overlapping cluster under a specific principle so that the uplink-downlink configurations configured by the different central node devices for the network node devices in the overlapping cluster are consistent. Particularly the central node device interacts with the other adjacent central node devices to obtain information about uplink-downlink configurations configured by the other adjacent central node devices for network node devices in their respective clusters or the overlapping cluster which is a cluster common to the central node device and the other adjacent central node devices; and adjusts the uplink-downlink configuration configured by the central node device for the network node devices in the overlapping cluster according to the obtained information about the uplink-downlink configurations configured by the other adjacent central node devices for the network node devices in the overlapping cluster.

Figure 6:
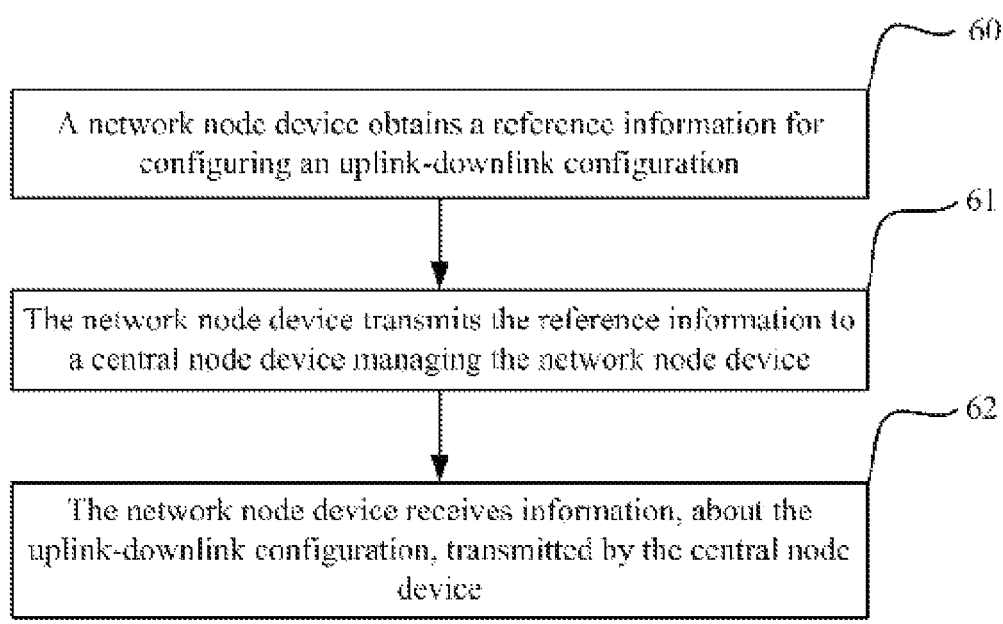
FIG. 6 is a schematic flow chart of another method according to an embodiment of the invention.

Referring to FIG. 6, an uplink-downlink configuration method in a system in a TDD communication mode at the network node device side according to an embodiment of the invention includes the following steps:

In the operation 60, a network node device obtains reference information for configuring an uplink-downlink configuration;

In the operation 61, the network node device transmits the reference information to a central node device managing the network node device; and In the operation 62, the network node device receives information, about the uplink-downlink configuration, transmitted by the central node device.

Preferably after the network node device receives the information, about the uplink-downlink configuration, transmitted by the central node device, the network node device can transmit the received information about the uplink-downlink configuration to a user equipment covered by the network node device.

In the present method, the reference information transmitted by the network node device can include one or any combination of the following information.

The amount of data to be transmitted in the uplink and the amount of data to be transmitted in the downlink of the network node device and/or the user equipment;

The amount of data to be transmitted in the uplink, the amount of data to be transmitted in the downlink, the amount of data transmitted in the uplink and the amount of data transmitted in the downlink of the network node device and/or the user equipment;

The utilization ratio of uplink sub-frames and the utilization ratio of downlink sub-frames of the network node device and/or the user equipment;

The ratio of needed uplink/downlink sub-frames of the network node device and/or the user equipment; and The information of uplink-downlink configuration used or to be used by network node device and/or the user equipment.

Preferably the central node device manages at least one network node device, and the network node device(s) managed by the central node device can be divided in advance into at least one cluster, each of which includes at least one network node device; and the reference information transmitted by the network node device further includes information about a cluster to which the network node device belongs so that the central node device determines from the information the cluster to which the network node device belongs; or The reference information transmitted by the network node device further includes geographical information of the network node device so that the central node device can determine from the information interference conditions between the respective network node devices and can further divide them into clusters dependent upon the interference conditions.

In the invention, the central node device is a logic entity which can be located particularly in a device functioning as a base station or a management device capable of device management; and the network node device is a device functioning to at least transmit at the physical layer. The central node device can transmit the information about the to the user equipment in the form of a broadcast, etc.

For example, the device functioning as a base station can be a macro base station, a pico base station, a femto base station, etc.; and the network node device can be a pico base station, a femto base station, etc.

The invention will be described below with reference to particular embodiments thereof.

First Embodiment

Figure 7A:
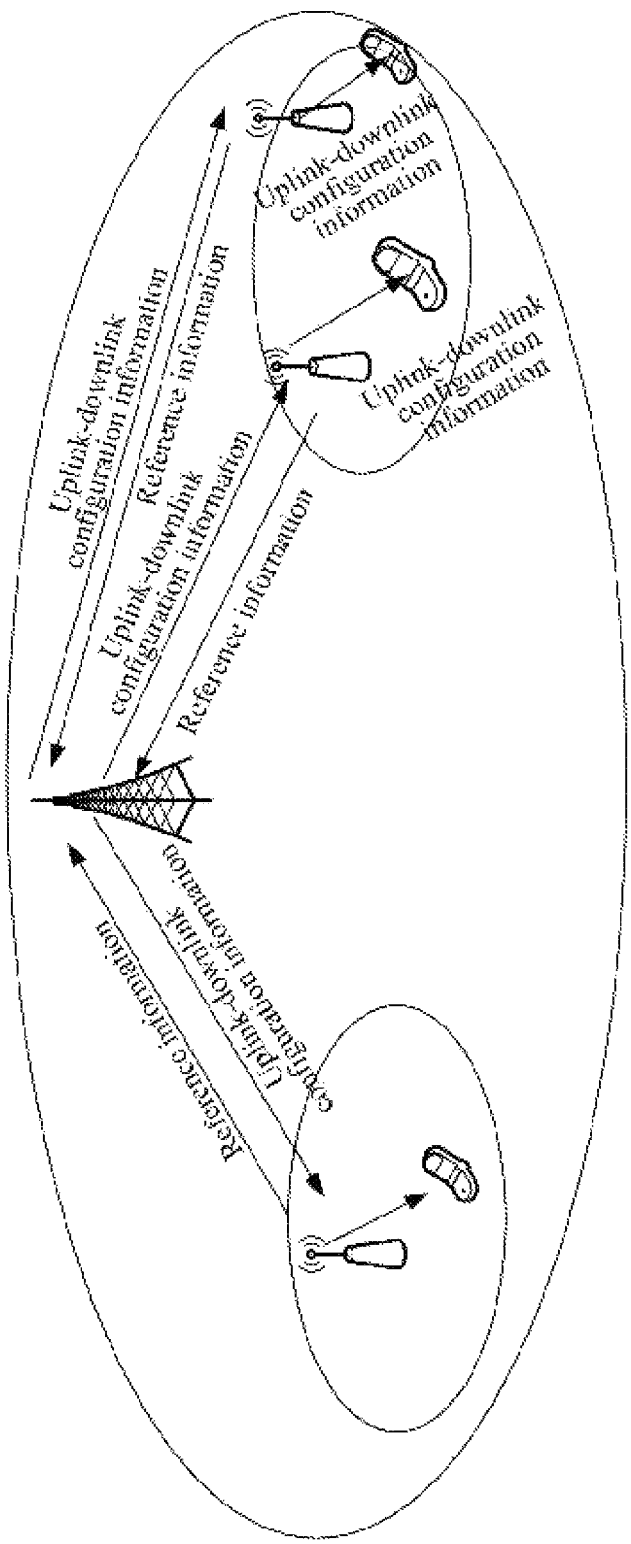
FIG. 7a is a schematic diagram of a network architecture according to a first embodiment of the invention.

As illustrated in FIG. 7*a*, an uplink-downlink configuration process is as follows:

In the first operation, a network node device transmits reference information, for configuring an uplink-downlink configuration, to a central node device.

In the second operation, the central node device receives the reference information transmitted by the network node device and configures the network node device with an uplink-downlink configuration based upon the received reference information. Typically the reference information is reference information of the network node device.

In the third operation, the central node device transmits information about the configured uplink-downlink configuration to the network node device after configuring the uplink-downlink configuration.

In the forth operation, the network node device transmits the received information about the uplink-downlink configuration to a user equipment covered by the network node device.

The central node device can be located in a device functioning as the entire base station, e.g., a macro base station, a pico base station or a femto base station; or can be located in a management device; and the network node device is a device functioning as the entire base station, e.g., a pico base station or a femto base station.

Second Embodiment

Figure 7B:
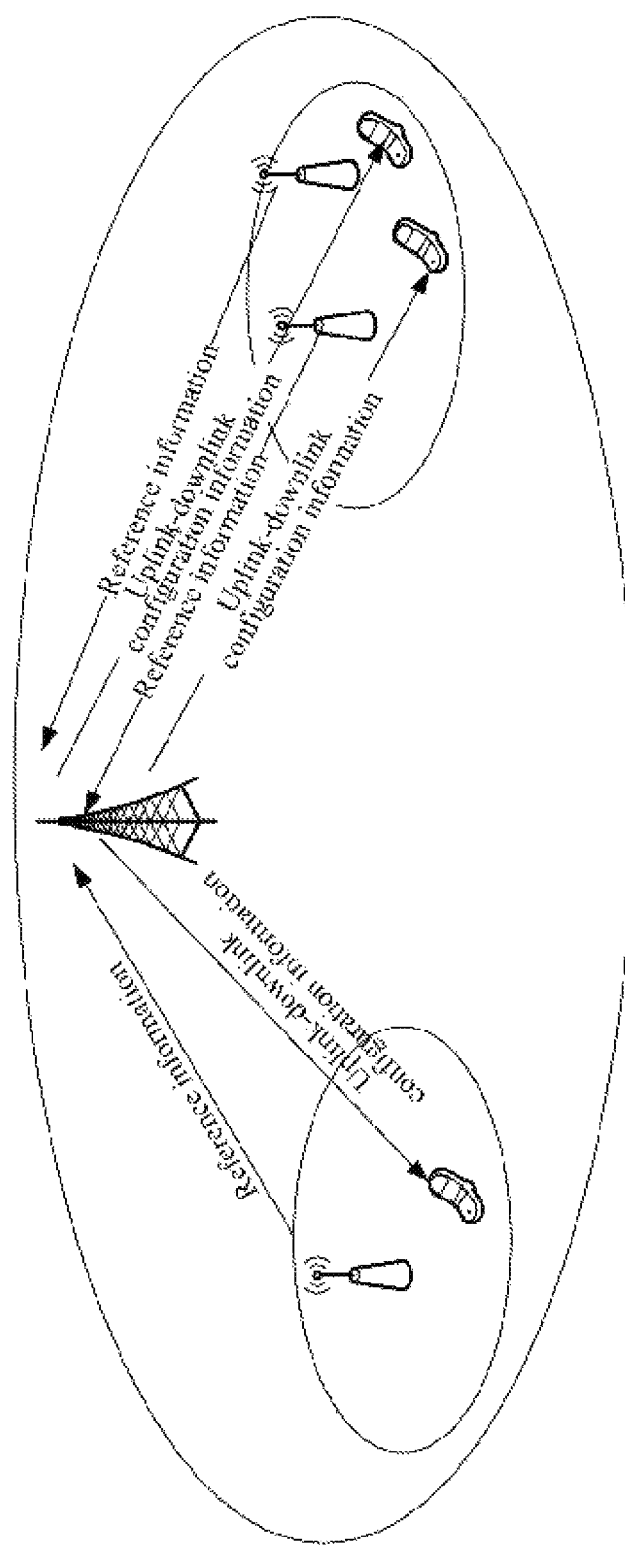
FIG. 7b is a schematic diagram of a network architecture according to a second embodiment of the invention.

As illustrated in FIG. 7b, an uplink-downlink configuration process is as follows:

In the first operation, a network node device transmits reference information, for configuring an uplink-downlink configuration, to a central node device.

In the second operation, the central node device receives the reference information transmitted by the network node device and configures a user equipment with an uplink-downlink configuration based upon the received reference information. Typically the reference information is reference information of the network node device or reference information of the network node device and the user equipment. In the latter case, the central node can configure the network node device and the user equipment separately with uplink-downlink configurations.

In the third operation, the central node device transmits information about the uplink-downlink configuration configured by the central node device to the network node device and the user equipment after configuring the uplink-downlink configuration.

The central node device can be located in a device functioning as the entire base station, e.g., a macro base station, a pico base station or a femto base station functioning as the entire base station; or the central node device can alternatively be located in a management device capable of transmitting at the physical layer; and the network node device is a device functioning as the entire base station, e.g., a pick) base station or a femto base station functioning as the entire base station; or the network node device can alternatively be located in a management device capable of only transmitting at the physical layer, e.g., a pico base station or a femto base station capable of only transmitting at the physical layer.

Third Embodiment

Figure 7C:
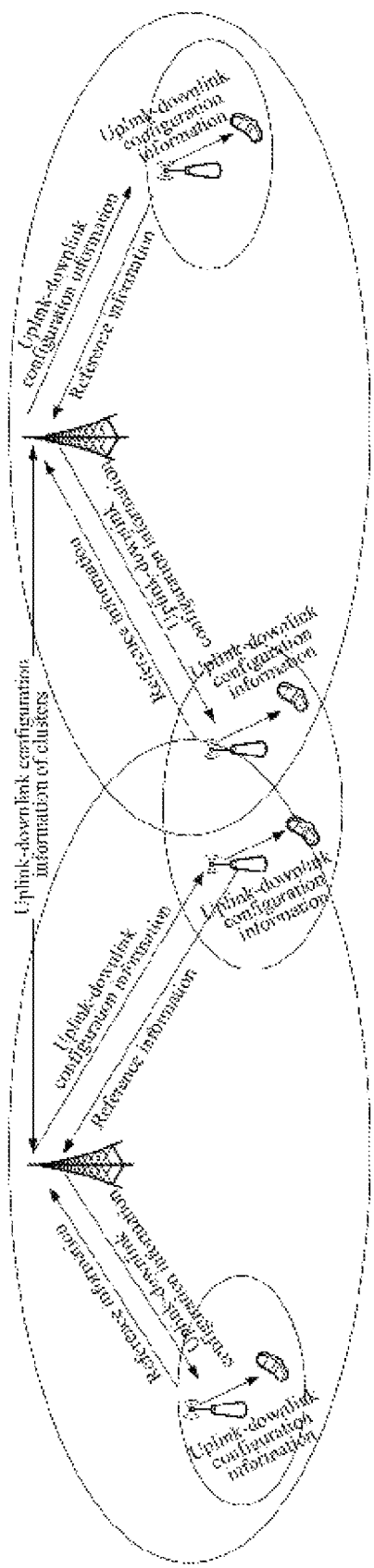
FIG. 7c is a schematic diagram of a network architecture according to a third embodiment of the invention.

As illustrated in FIG. 7c, an uplink-downlink configuration process is as follows:

In the first operation, a network node device transmits reference information, for configuring an uplink-downlink configuration, to a central node device.

In the second operation, the central node device receives the reference information transmitted by the network node device and configures the network node device with an uplink-downlink configuration based upon the received reference information. Typically the reference information is reference information of the network node device.

In the third operation, the central node device exchanges information about uplink-downlink configurations of clusters with other adjacent central node devices after configuring the uplink-downlink configuration separately.

In the forth operation, the central node device adjusts the uplink-downlink configuration configured for the network node device according to the exchanged information about the uplink-downlink configurations of the clusters.

In the fifth operation, the central node device transmits information about the adjusted uplink-downlink configuration to the net pork node device after adjusting the uplink-downlink configuration.

In the sixth operation the network node device transmits the received information about the uplink-downlink configuration to a user equipment covered by the network node device.

The central node device can be located in a device functioning as the entire base station, e.g., a macro base station, a pico base station or a femto base station; or the central node device can alternatively be located in a management device; and the network node device is a device functioning as the entire base station, e.g., a pico base station or a femto base station.

Fourth Embodiment

Figure 7D:
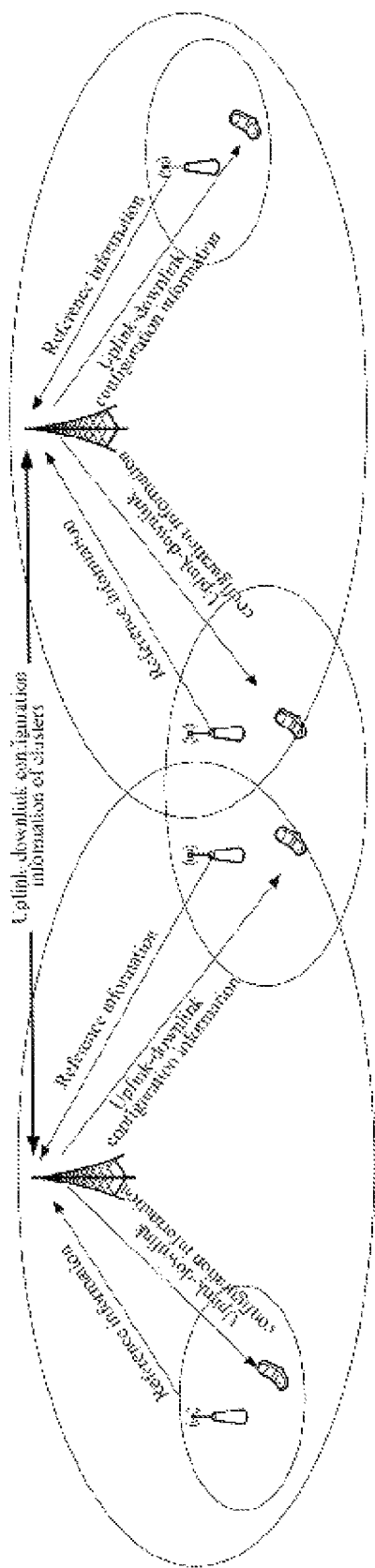
FIG. 7d is a schematic diagram of a network architecture according to a fourth embodiment of the invention.

As illustrated in FIG. 7d, an uplink-downlink configuration process is as follows:

In the first operation, a network node device transmits reference information, for configuring an uplink-downlink configuration, to a central node device.

In the second operation, the central node device receives the reference information transmitted by the network node device and configures a user equipment with an uplink-downlink configuration based upon the received reference information. Typically the reference information is reference information of the network node device or reference information of the network node device and the user equipment. In the latter case, the central node can configure the network node device and the user equipment separately with uplink-downlink configurations.

In the third operation, the central node device exchanges information about uplink-downlink configurations of clusters with other adjacent central node devices after configuring the uplink-downlink configuration separately.

In the forth operation, the central node device adjusts the uplink-downlink configuration configured for the user equipment according to the exchanged information about the uplink-downlink configurations of the clusters.

In the fifth operation, the central node device transmits information about the adjusted uplink-downlink configuration to the network node device and the user equipment after adjusting the uplink-downlink configuration.

The central node device can be located in a device functioning as the entire base station, e.g., a macro base station, a pico base station or a femto base station functioning as the entire base station; or the central node device can alternatively be located in a management device capable of transmitting at the physical layer; and the network node device is a device functioning as the entire base station, e.g., a pico base station or a femto base station functioning as the entire base station; or the network node device can alternatively be located in a management device capable of only transmitting at the physical layer, e.g., a pico base station or a femto base station capable of only transmitting at the physical layer.

Fifth Embodiment

Figure 7E:
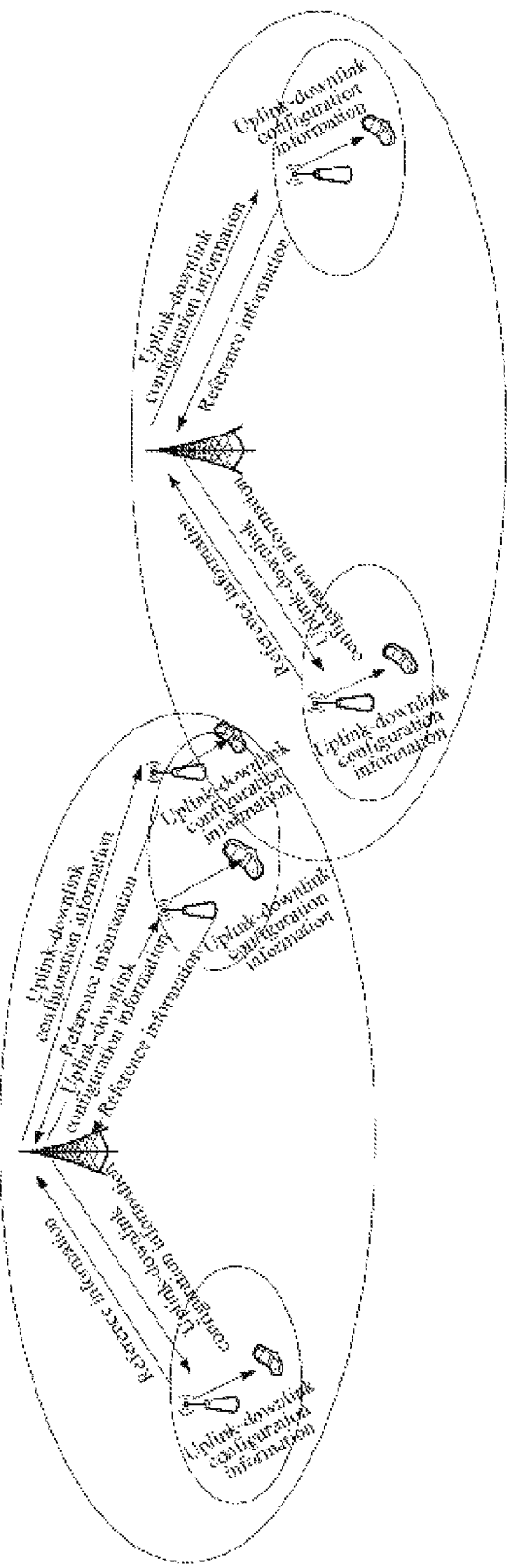
FIG. 7e is a schematic diagram of a network architecture according to a fifth embodiment of the invention.

As illustrated in FIG. 7e, although there are also a plurality of central node devices in the network, network node devices are allocated and managed to ensure that network node devices in the same cluster are served by a central node device, so there is no overlapping cluster across management regions of adjacent central node devices. Thus no information needs to be exchanged between the central node devices. An uplink-downlink configuration process in this scenario is the same as that in the first embodiment.

Sixth Embodiment

Figure 7F:
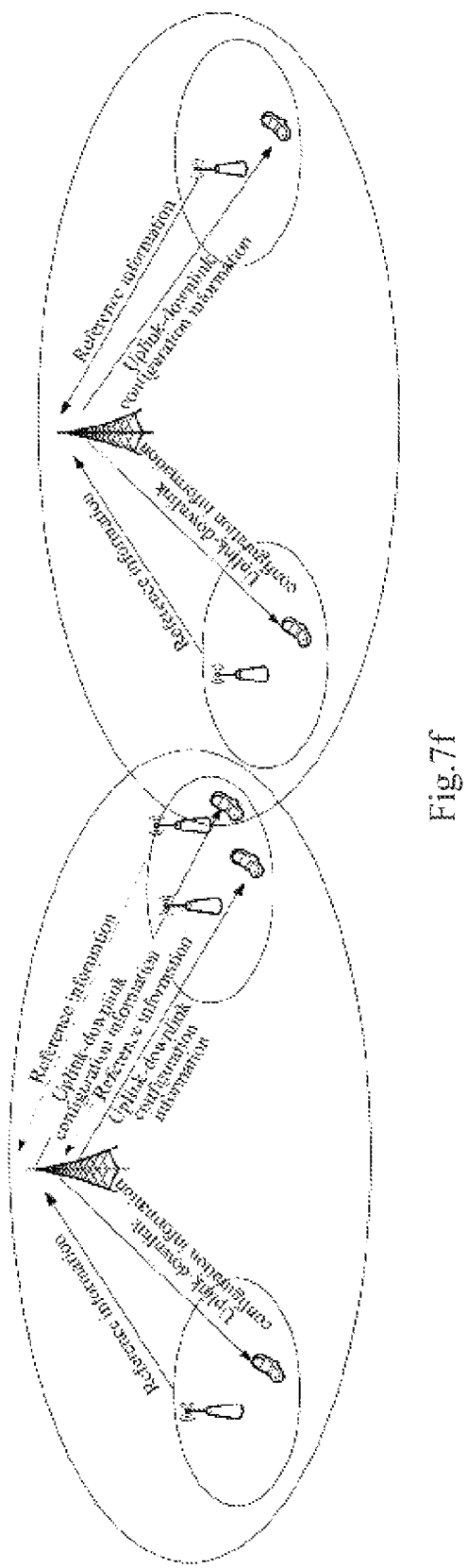
FIG. 7f is a schematic diagram of a network architecture according to a sixth embodiment of the invention.

As illustrated in FIG. 7f, there is a network with a plurality of central node devices (there is no overlapping cluster across management regions of adjacent central node devices). Although there are also a plurality of central node devices in the network, network node devices are allocated and managed to ensure that network node devices in the same cluster are served by a central node device, so there is no overlapping cluster across management regions of adjacent central node devices. Thus no information needs to be exchanged between the central node devices. An uplink-downlink configuration process in this scenario is the same as that in the second embodiment.

Seventh Embodiment

In the present embodiment, when reference information transmitted by a network node device includes the amount of data to be transmitted in the uplink and the amount of data to be transmitted in the downlink of the network node device or includes the amount of data to be transmitted in the uplink, the amount of data to be transmitted in the downlink, the amount of data transmitted in the uplink and the amount of data transmitted in the downlink of the network node device, a central node device configures the network node device with an uplink-downlink configuration according to the reference information.

In the scheme 1, the central node device de ermines an uplink-downlink configuration according to reference information, for configuring an uplink-downlink configuration, transmitted by one network node in a cluster and configures respective network node devices in the cluster with the determined uplink-downlink configuration.

There are N network node devices managed by the central node device. Typically the N network node devices ($n=n_0$, $n_1$, $n_2$ ... $n_{N-1}$) are divided into M clusters ($m=m_0$, $m_1$, $m_2$ ... $m_{M-1}$) dependent upon inter-eNB or and inter-UE interference, especially for inter-eNB interference conditions, and each of the clusters includes one or more network node devices i.e., $m_i=\{n_l\}$ or $m_i=\{n_l, \ldots n_q\}$. There is serious inter-eNB or and inter-UE interference, especially thr inter-eNB interference between network nodes in the same cluster (if there is inter-eNB or and inter-UE interference, especially for inter-eNB interference). Inter-eNB or and inter-UE interference, especially for inter-eNB interference between different clusters can be disregarded.

When the reference information includes the amount of data to be transmitted in the uplink and the amount of data to be transmitted in the downlink of the network node device, if there is one network node device in the cluster, then the value of $$\frac{U_n}{D_n}$$

is calculated, and an uplink-downlink configuration with the corresponding proportion of uplink/downlink sub-frames which is the closest to the value is determined, where $U_n$ represents the amount of data to be transmitted in the uplink of the network node device, and $D_n$ represents the amount of data to be transmitted in the downlink of the network node device; or When the reference information includes the amount of data to be transmitted in the uplink and the amount of data to be transmitted in the downlink of the network node device, if there are a plurality of network node devices in the cluster, then the value of $$\frac{U_n}{D_n}$$

is calculated for each of the network node devices, and an uplink-downlink configuration with the corresponding proportion of uplink/downlink sub-frames which is the closest to the maximum or the minimum of the calculated values is determined, where $U_n$ represents the amount of data to be transmitted in the uplink of the corresponding network node device, and $D_n$ represents the amount of data to be transmitted in the downlink of the corresponding network node device; or When the reference information includes the amount of data to be transmitted in the uplink, the amount of data to be transmitted in the downlink, the amount of data transmitted in the uplink and the amount of data transmitted in the downlink of the network node device, if there is one network node device in the cluster, then the value of $$\alpha \frac{U_n}{D_n} + \beta \frac{Ued_n}{Ded_n}$$

is calculated, and an uplink-downlink configuration with the corresponding proportion of plink/downlink sub-frames which is the closest to the value is determined, where $U_n$ represents the amount of data to be transmitted in the uplink of the network node device, $D_n$ represents the amount of data to be transmitted in the downlink of the network node device, $Ued_n$ represents the amount of data transmitted in the uplink of the network node device, and $Ded_n$ represents the amount of data transmitted in the downlink of the network node device, and $\alpha+\beta=1$; or When the reference information includes the amount of data to be transmitted in the uplink and the amount of data to be transmitted in the downlink of the network node device, if there are a plurality of network node devices in the cluster, then the value of $$\alpha \frac{U_n}{D_n} + \beta \frac{Ued_n}{Ded_n}$$

is calculated for each of the network node devices, and an uplink-downlink configuration with the corresponding proportion of uplink/downlink sub-frames which is the closest to the maximum or the minimum of the calculated values is determined, where $U_n$ represents the amount of data to be transmitted in the uplink of the corresponding network node device, $D_n$ represents the amount of data to be transmitted in the downlink of the corresponding network node device, $Ued_n$ represents the amount of data transmitted in the uplink of the corresponding network node device, and $Ded_n$ represents the amount of data transmitted in the downlink of the corresponding network node device, and $\alpha+\beta=1$.

In the scheme 2, the central node counts reference information, fir configuring uplink-downlink configurations, transmitted by respective network node devices in a cluster, determines an uplink-downlink configuration according to a result of counting and configures the respective network node devices in the cluster with the determined uplink-downlink configuration.

There are N network node devices managed by the central node device. Typically the N network node devices ($n=n_0$, $n_1$, $n_2$ ... $n_{N-1}$) are divided into M clusters ($m=m_0$, $m_1$, $m_2$ ... $m_{M-1}$) dependent upon inter-eNB or and inter-UE interference, especially for inter-eNB interference conditions, and each of the clusters includes one or more network node devices, i.e. $m_i=\{n_l\}$ or $m_i=\{n_l, \ldots n_q\}$. There is serious inter-eNB or and inter-UE interference, especially for inter-eNB interference between network nodes in the same cluster (if there is inter-eNB or and inter-UE interference, especially for inter-eNB interference), inter-eNB or and inter-UE interference, especially for inter-eNB interference between different clusters can be disregarded.

When the reference information includes the amounts of data to be transmitted in the uplink and the amount of data to be transmitted in the downlink of the network node devices, the value of $$\frac{\overline{U_n}}{\overline{D_n}}$$

is calculated, where $\overline{U_n}$ represents the average of the amounts of data to be transmitted in the uplink of the respective network node devices in the cluster, and $\overline{D_n}$ represents the average of the amounts of data to be transmitted in the downlink of the respective network node devices in the cluster; or When the reference information includes the amounts of data to be transmitted in the uplink, the amount of data to be transmitted in the downlink, the amounts of data transmitted in the uplink and the amount of data transmitted of the network node devices, the value of $$\alpha \frac{\overline{U_n}}{\overline{D_n}} + \beta \frac{\overline{Ued_n}}{\overline{Ded_n}},$$

and an uplink-downlink configuration with the corresponding proportion of uplink/downlink sub-frames which is the closest to the value is determined is calculated, where $\overline{U_n}$ represents the average of the amounts of data to be transmitted in the uplink of the respective network node devices in the cluster, $\overline{D_n}$ represents the average of the amounts of data to be transmitted in the downlink of the respective network node devices in the cluster, $\overline{Ued_n}$ represents the average of the amounts of data transmitted in the uplink of the respective network node devices in the cluster, and $\overline{Ded_n}$ represents the average of the amounts of data transmitted in the downlink of the respective network node devices in the cluster, and $\alpha+\beta=1$.

Eighth Embodiment

In the present embodiment, when reference information transmitted by a network node device includes the utilization ratio of uplink sub-frames and the utilization ratio of downlink sub-frames of the network node device, a central node device configures the network node device with an uplink-downlink configuration according to the reference information.

In the scheme 1, the central node device determines an uplink-downlink configuration according to reference information, for configuring an uplink-downlink configuration, transmitted by one network node in a cluster and configures respective network node devices in the cluster with the determined uplink-downlink configuration.

There are N network node devices managed by the central node device. Typically the N network node devices ($n=n_0$, $n_1$, $n_2$ ... $n_{N-1}$) are divided into M clusters ($m=m_0$, $m_1$, $m_2$ ... $m_{M-1}$) dependent upon inter-eNB or and inter-UE interference, especially for inter-eNB interference conditions, and each of the clusters includes one or more network node devices, i.e., $m_i=\{n_l\}$ or $m_i=\{n_l, \ldots n_q\}$. There is serious inter-eNB or and inter-UE interference, especially for inter-eNB interference between network nodes in the same cluster (if there is inter-eNB or and inter-UE interference, especially for inter-eNB interference). Inter-eNB or and inter-UE interference, especially for inter-eNB interference between different clusters can be disregarded.

If there is one network node device in the cluster, then the value of $$\frac{Pu_n}{Pd_n}$$

is calculated, and an uplink-downlink configuration with the corresponding proportion of uplink/downlink sub-frames which is the closest to the value is determined, where $Pu_n$ represents the utilization ratio of uplink sub-frames of the network node device, and $Pd_n$ represents the utilization ratio of downlink sub-frames of the network node device; or If there are a plurality of network node devices in the cluster, then the value of $$\frac{Pu_n}{Pd_n}$$

is calculated for each of the network node devices, and an uplink-downlink configuration with the corresponding proportion of uplink/downlink sub-frames which is the closest to the maximum or the minimum of the calculated values is determined, where $Pu_n$ represents the utilization ratio of uplink sub-frames of the corresponding network node device, and $Pd_n$ represents the utilization ratio of downlink sub-frames of the corresponding network node device.

In the scheme 2, the central node counts reference information, for configuring uplink-downlink configurations, transmitted by respective network node devices in a cluster, determines an uplink-downlink configuration according to a result of counting and configures the respective network node devices in the cluster with the determined uplink-downlink configuration.

There are N network node devices managed by the central node device. Typically the N network node devices ($n=n_0$, $n_1$, $n_2$ ... $n_{N-1}$) are divided into M clusters ($m=m_0$, $m_1$, $m_2$ ... $m_{M-1}$) dependent upon inter-eNB or and inter-UE interference, especially for inter-eNB interference conditions, and each of the clusters includes one or more network node devices, i.e., $m_i=\{n_l\}$ or $m_i=\{n_l, \ldots n_q\}$. There is serious inter-eNB or and inter-UE interference, especially for inter-eNB interference between network nodes in the same cluster (if there is inter-eNB or and inter-UE interference, especially for ter-eNB interference). Inter-eNB or and inter-UE interference, especially for inter-eNB interference between different clusters can be disregarded.

The central node device calculates the value of $$\frac{\overline{Pu_n}}{\overline{Pd_n}}$$

and determines an uplink-downlink configuration with the corresponding proportion of uplink/downlink sub-frames which is the closest to the value, where $\overline{Pu_n}$ represents the average of the utilization ratios of uplink sub-frames of the respective network node devices in the cluster, and $\overline{Pd_n}$ represents the average of the utilization ratios of downlink sub-frames of the respective network node devices in the cluster.

Ninth Embodiment

In the present embodiment, when reference information transmitted by a network node device includes the ratio of needed uplink/downlink sub-frames of the network node device or reference configuration information of uplink/downlink sub-frames, a central node device configures the network node device with an uplink-downlink configuration according to the reference information. The ratio of needed uplink/downlink sub-frames can be derived from the reference configuration information of uplink/downlink sub-frames, for example, the ratio of needed uplink/downlink sub-frames corresponding to the uplink-downlink configuration 0 is 1.7, and furthermore derivation thereof from spectrum efficiencies can also be conceived.

In the scheme 1, the central node device determines an uplink-downlink configuration according to reference information, for configuring an uplink-downlink configuration, transmitted by a network node in a cluster and configures respective network node devices in the cluster with the determined uplink-downlink configuration.

There are N network node devices managed by the central node device. Typically the N network node devices ($n=n_0$, $n_1, n_2 \ldots n_{N-1}$) are divided into M clusters ($m=m_0, m_1, m_2 \ldots m_{M-1}$) dependent upon inter-eNB or and inter-UE interference, especially for inter-eNB interference conditions and each of the clusters includes one or more network node devices, i.e., $m_j=\{n_l\}$ or $m_j=\{n_p, \ldots n_q\}$. There is serious inter-eNB or and inter-LIE interference, especially for inter-eNB interference between network nodes in the same cluster (if there is inter-eNB or and inter-UE interference, especially for ter-eNB interference). Inter-eNB or and inter-UE interference, especially for inter-eNB interference between different clusters can be disregarded.

When the reference information includes the ratio of needed uplink/downlink sub-frames of the network node device, if there is one network node device in the cluster, then an uplink-downlink configuration with the corresponding proportion of uplink/downlink sub-frames which is the closest to the ratio of needed uplink/downlink sub-frames is determined; or When the reference information includes the ratio of needed uplink/downlink sub-frames of the network node device, if there are a plurality of network node devices in the cluster, then the maximum or the minimum of the ratios of needed uplink/downlink sub-frames of the respective network node device in the cluster is selected, and an uplink-downlink configuration with the corresponding proportion of uplink/downlink sub-frames which is the closest to the selected ratio of needed uplink/downlink sub-frames is determined; or When the reference information includes the reference configuration information of uplink/downlink sub-frames of the network node device, if there is one network node device in the cluster, then the proportion of uplink/downlink sub-frames corresponding to the reference configuration information of uplink/downlink sub-frames is calculated, and an uplink-downlink configuration with the corresponding proportion of uplink/downlink sub-frames which is the closest to the calculated proportion of uplink/downlink sub-frames is determined; or When the reference information includes the reference configuration information of uplink/downlink sub-frames of the network node device, if there are a plurality of network node devices in the cluster, then the proportions of uplink/downlink sub-frames corresponding to the reference configuration information of uplink/downlink sub-frames of the respective network node devices in the cluster are calculated, the maximum or the minimum of the calculated proportions of uplink/downlink sub-frames is selected, and an uplink-downlink configuration with the corresponding proportion of uplink/downlink sub-frames which is the closest to the selected proportion of uplink/downlink sub-frames is determined.

In the scheme 2, the central node counts reference information, for configuring uplink-downlink configurations, transmitted by respective network node devices in a cluster, determines an uplink-downlink configuration according to a result of counting and configures the respective network node devices in the cluster with the determined uplink-downlink configuration.

There are N network node devices managed by the central node device. Typically the N network node devices ($n=n_0$, $n_1, n_2 \ldots n_{N-1}$) are divided into M clusters ($m=m_0, m_1, m_2 \ldots m_{M-1}$) dependent upon inter-eNB or and inter-UE interference, especially for inter-eNB interference conditions, and each of the clusters includes one or more network node devices, i.e. $m_j=\{n_l\}$ or $m_j=\{n_p, \ldots n_q\}$. There is serious inter-eNB or and inter-UE interference, especially for inter-eNB interference between network nodes in the same cluster (if there is inter-eNB or and inter-UE interference, especially for inter-eNB interference). Inter-eNB or and inter-UE interference, especially for inter-eNB interference between different clusters can be disregarded.

When the reference information includes the ratio of needed uplink/downlink sub-frames of the network node device, the average of the ratios of needed uplink/downlink sub-frames of the respective network node device in the cluster is calculated, and an uplink-downlink configuration with the corresponding proportion of uplink/downlink sub-frames which is the closest to the average is determined; or When the reference information includes the reference configuration information of uplink/downlink sub-frames of the network node device, the average of the proportions of uplink/downlink sub-frames corresponding to the reference configuration information of uplink/downlink sub-frames of the respective network node device in the cluster is calculated, and an uplink-downlink configuration with the corresponding proportion of uplink/downlink sub-frames which is the closest to the average is determined.

In an instance of derivation from spectrum efficiencies, the amount of data to be transmitted in the uplink of the network node device is U, and the amount of data to be transmitted in the downlink thereof is D; and the uplink spectrum efficiency is SU, and the downlink spectrum efficiency is SD. If the spectrum efficiencies are taken into account, then the proportion of uplink/downlink sub-frames is U*SD/(D*SU); and if no spectrum efficiency is taken into account, then the proportion of uplink/downlink sub-frames is U/D.

Tenth Embodiment

As illustrated in FIG. 7c or FIG. 7d, when there is an inevitable overlapping cluster, central node devices need to exchange information about uplink-downlink configurations of the overlapping cluster with each other, i.e., information about uplink-downlink configurations of respective clusters, ($C_1, C_2 \cdot C_{M-1}$), or information about uplink-downlink configurations of overlapping clusters, ($C_1, C_2 \cdot C_{J-1})_i$, where J clusters overlap. When this information is received by a central node device, the central node device adjusts the uplink-downlink configurations of the overlapping clusters $(m_1, m_2 \cdot m_{J-1})$, particularly in the following three adjustment schemes:

In the scheme 1, the central node device selects an uplink-downlink configuration with the corresponding proportion of uplink/downlink sub-frames which is the maximum or the minimum among an uplink-downlink configuration configured by the central node device for network node devices in an overlapping cluster and uplink-downlink configurations configured by other adjacent central node devices for the network node devices in the overlapping cluster, and adjusts the uplink-downlink configuration configured by the central node device for the network node devices in the overlapping cluster to the selected uplink-downlink configuration.

In the scheme 1, the central node device calculates the average of the proportion of uplink/downlink sub-frames corresponding to an uplink-downlink configuration configured by the central node device for network node devices in an overlapping cluster and the proportions of uplink/downlink sub-flames corresponding to uplink-downlink configurations configured by other adjacent central node devices for the network node devices in the overlapping cluster, selects an uplink-downlink configuration with the corresponding proportion of uplink/downlink sub-frames which is the closest to the average, and adjusts the uplink-downlink configuration configured by the central node device for the network node devices in the overlapping cluster to the selected uplink-downlink configuration.

In the scheme 3, the central node device selects an uplink-downlink configuration configured by a reference central node device for network node devices in an overlapping cluster and adjusts an uplink-downlink configuration configured by the central node device for the network node devices in the overlapping cluster to the selected uplink-downlink configuration, where the reference central node device is one of the other central node devices adjacent to the central node device.

Figure 8:
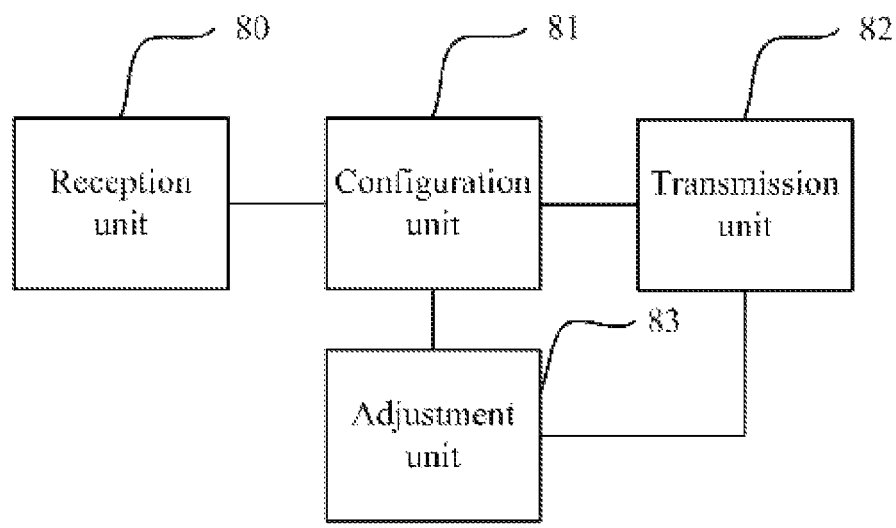
FIG. 8 is a schematic structural diagram of a device according to an embodiment of the invention.

Referring to FIG. 8, an embodiment of the invention provides a central node device including:

A reception unit 80 is configured to receive a reference information, for configuring an uplink-downlink configuration, transmitted by a network node device managed by the central node device;

A configuration unit 81 is configured to configure the uplink-downlink configuration according to the received reference information; and A transmission unit 82 is configured to transmit information about the configured uplink-downlink configuration to the corresponding network node device or to the corresponding network node device and a user equipment.

Furthermore the configuration unit 81 is configured:

When the central node device manages at least one network node device, and the network node device(s) managed by the central node device is(are) divided into at least one cluster, each of which includes at least one network node device, for each cluster served by the central node device, to determine an uplink-downlink configuration according to reference information, for configuring an uplink-downlink configuration, transmitted by a network node device in the cluster and to configure respective network node devices in the cluster with the determined uplink-downlink configuration.

Furthermore the configuration unit 81 is configured:

To determine an uplink-downlink configuration according to a reference information, for configuring an uplink-downlink configuration, transmitted by one network node device in the cluster; or To count reference information, for configuring an uplink-downlink configuration, transmitted by the respective network node device in the cluster and to determine an uplink-downlink configuration from a result of counting.

Furthermore the reference information includes one or any combination of the following information:

The amount of data to be transmitted in the uplink and the amount of data to be transmitted in the downlink of the network node device and/or the user equipment;

The amount of data to be transmitted in the uplink, the amount of data to be transmitted in the downlink, the amount of data transmitted in the uplink and the amount of data transmitted in the downlink of the network node device and/or the user equipment;

The utilization ratio of uplink sub-frames and the utilization ratio of downlink sub-frames of the network node device and/or the user equipment;

The ratio of needed uplink/downlink sub-frames of the network node device and/or the user equipment; and Reference configuration information of uplink/downlink sub-frames of the network node device and/or the user equipment.

Furthermore the reference information further includes information about a cluster to which the network node device belongs so that the central node device determines from the information the cluster to which the network node device belongs; or The reference information transmitted by the network node device further includes geographical information of the network node device.

Furthermore the central node device further includes:

An adjustment unit 83 is configured to interact with other adjacent central node devices to obtain information about uplink-downlink configurations configured by the other adjacent central node devices for network node devices in their respective clusters or an overlapping cluster which is a cluster common to the central node device and the other adjacent central node devices; and to adjust the uplink-downlink configuration configured by the configuration unit for the network node devices in the overlapping cluster according to the obtained information about the uplink-downlink configurations configured by the other adjacent central node devices for the network node devices in the overlapping cluster; and The transmission unit 82 is configured:

To transmit information about the adjusted uplink-downlink configuration to the corresponding network node device or to the corresponding network node device and the user equipment.

Furthermore the adjustment unit 83 is configured:

To select an uplink-downlink configuration with the corresponding proportion of uplink/downlink sub-frames which is the maximum or the minimum among the uplink-downlink configuration configured by the central node device for the network node devices in the overlapping cluster and the uplink-downlink configurations configured by the other adjacent central node devices for the network node devices in the overlapping cluster, and to adjust the uplink-downlink configuration configured by the configuration unit for the network node devices in the overlapping cluster to the selected uplink-downlink configuration; or To calculate the average of the proportion of uplink/downlink sub-frames corresponding to the uplink-downlink configuration configured by the configuration unit for the network node devices in the overlapping cluster and the proportions of uplink/downlink sub-frames corresponding to the uplink-downlink configurations configured by the other adjacent central node devices for the network node devices in the overlapping cluster, to select an uplink-downlink configuration with the corresponding proportion of uplink/downlink sub-frames which is the closest to the average, and to adjust the uplink-downlink configuration configured by the configuration unit for the network node devices in the overlapping cluster to the selected uplink-downlink configuration; or To select an uplink-downlink configuration configured by a reference central node device for the network node devices in the overlapping cluster and to adjust the uplink-downlink configuration configured by the configuration unit for the network node devices in the overlapping cluster to the selected plink-downlink configuration, where the reference central node device is one of the other central node devices adjacent to the central node device.

Furthermore network node devices in the same cluster are geographically adjacent and operate over the same TDD carrier; or Network node devices in the same cluster are geographically overlapping or adjacent and operate over the same TDD carrier.

Figure 9:
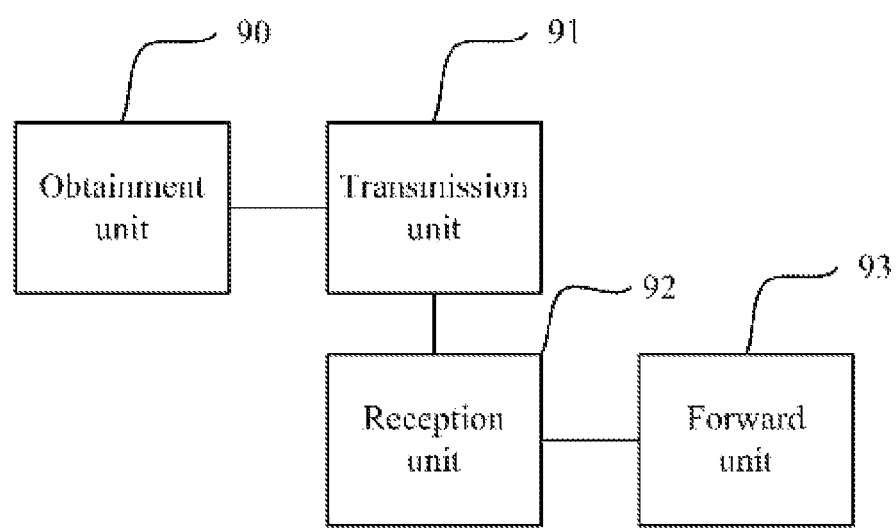
FIG. 9 is a schematic structural diagram of another device according to an embodiment of the invention.

Referring to FIG. 9, an embodiment of the invention further includes a network node device including:

An obtainment unit 90 is configured to obtain reference information for configuring an uplink-downlink configuration;

A transmission unit 91 is configured to transmit the reference information to a central node device managing the network node device; and A reception unit 92 is configured to receive information, about an uplink-downlink configuration, transmitted by the central node device.

Furthermore the network node device further includes:

A forward unit 93 is configured to transmit the information about the uplink-downlink configuration to a user equipment covered by the network node device.

Furthermore the reference information includes one or any combination of the following information:

The amount of data to be transmitted in the uplink and the amount of data to be transmitted in the downlink of the network node device and/or the user equipment;

The amount of data to be transmitted in the uplink, the amount of data to be transmitted in the downlink, the amount of data transmitted in the uplink and the amount of data transmitted in the downlink of the network node device and/or the user equipment;

The utilization ratio of uplink sub-frames and the utilization ratio of downlink sub-frames of the network node device and/or the user equipment;

The ratio of needed uplink/downlink sub-frames of the network node device and/or the user equipment; and Reference configuration information of uplink/downlink sub-frames of the network node device and/or the user equipment.

The central node device manages at least one network node device, and the network node device(s) managed by the central node device is(are) divided into at least one cluster, each of which includes at least one network node device; and the reference information further includes information about a cluster to which the network node device belongs; or The reference information further includes geographical information of the network node device.

In summary, advantageous effects of the invention includes:

In the solution according to the embodiments of the invention, a central node device configures an uplink-downlink configuration according to reference information transmitted by a network node device and transmits information about the uplink-downlink configuration configured by the central node device to the corresponding network node device or to the corresponding network node device and a user equipment, and as compared with the prior art in which a base station configures dynamically an uplink-downlink configuration based upon a real-time demand for a service and a real-time channel condition, the central node device can further optimize a configuration solution to more appropriate allocation of uplink/downlink sub-frames according to the reference information transmitted by the network node device(s) managed by the central node device in the present solution.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart, and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An uplink-downlink configuration method in a system in a Time Division Duplex (TDD) communication mode, the method comprising:
   a central node device receiving a reference information, for configuring an uplink-downlink configuration, transmitted by a network node device managed by the central node device;
   the central node device configuring the uplink-downlink configuration according to the received reference information; and
   the central node device transmitting information about the uplink-downlink configuration configured by the central node device to the corresponding network node device or to a corresponding network node device and a user equipment;
   wherein the reference information comprises a combination of at least one of following information and an utilization ratio of uplink sub-frames, an utilization ratio of downlink sub-frames of the network node device, and the user equipment;
   wherein the following information comprises:
   an amount of data to be transmitted in the uplink and an amount of data to be transmitted in the downlink of the network node device and/or the user equipment;
   an amount of data to be transmitted in the uplink, an amount of data to be transmitted in the downlink, an amount of data transmitted in the uplink and an amount of data transmitted in the downlink of the network node device and/or the user equipment;
   a demand ratio of uplink/downlink sub-frames of the network node device and/or the user equipment; and
   a reference configuration information of uplink/downlink sub-frames of the network node device and/or the user equipment.

2. The method of claim 1, wherein the central node device manages at least one network node device, and the network node device(s) managed by the central node device is(are) divided into at least one cluster, each of which includes at least one network node device; and
   the central node device configuring an uplink-downlink configuration according to the received reference information comprises:
   for each cluster served by the central node device, the central node device determining an uplink-downlink configuration according to reference information, for configuring an uplink-downlink configuration, transmitted by a network node device in the cluster, and the central node device configuring respective network node devices in the cluster with the uplink-downlink configuration determined by the central node device.

3. The method of claim 2, wherein the central node device determining an uplink-downlink configuration according to reference information, for configuring an uplink-downlink configuration, transmitted by a network node device in the cluster comprises:
   the central node device determining an uplink-downlink configuration according to reference information, for configuring the uplink-downlink configuration, transmitted by one network node device in the cluster; or
   the central node device counting reference information, for configuring an uplink-downlink configuration, transmitted by the respective network node device in the cluster and determining the uplink-downlink configuration from a result of counting.

4. The method of claim 2, wherein after the central node device configures an uplink-downlink configuration according to the received reference information and before the central node device transmits the information about the uplink-downlink configuration configured by the central node device to the corresponding network node device or to the corresponding network node device and the user equipment, the method further comprises:
   the central node device interacting with other adjacent central node devices to obtain information about uplink-downlink configurations configured by the other adjacent central node devices for network node devices in their respective clusters or an overlapping cluster which is a cluster common to the central node device and the other adjacent central node devices; and adjusting the uplink-downlink configuration configured by the central node device for the network node devices in the overlapping cluster according to the obtained information about the uplink-downlink configurations configured by the other adjacent central node devices for the network node devices in the overlapping cluster; and
   the central node device transmitting the information about the uplink-downlink configuration configured by the central device to the corresponding network node device or to the corresponding network node device and the user equipment comprises:
   the central node device transmitting the information about the uplink-downlink configuration adjusted by the central node device to the corresponding network node device or to the corresponding network node device and the user equipment.

5. The method of claim 1, wherein the reference information further includes information about a cluster to which the network node device belongs so that the central node device determines from the information the cluster to which the network node device belongs; or
   the reference information transmitted by the network node device further includes geographical information of the network node device.

6. An uplink-downlink configuration method in a system in a Time Division Duplex (TDD) communication mode, the method comprising:
   a network node device obtaining a reference information for configuring an uplink-downlink configuration;
   the network node device transmitting the reference information to a central node device managing the network node device; and
   the network node device receiving information, about the uplink-downlink configuration, transmitted by the central node device;
   wherein the reference information comprises a combination of at least one of following information and an utilization ratio of uplink sub-frames, an utilization ratio of downlink sub-frames of the network node device, and the user equipment;
   wherein the following information comprises:
   an amount of data to be transmitted in the uplink and the amount of data to be transmitted in the downlink of the network node device and/or the user equipment;
   an amount of data to be transmitted in the uplink, the amount of data to be transmitted in the downlink, the amount of data transmitted in the uplink and the amount of data transmitted in the downlink of the network node device and/or the user equipment;
   a ratio of needed uplink/downlink sub-frames of the network node device and/or the user equipment; and a reference configuration information of uplink/downlink sub-frames of the network node device and/or the user equipment.

7. The method of claim 6, wherein after the network node device receives the information, about the uplink-downlink configuration, transmitted by the central node device, the method further comprises:
the network node device transmitting the information about the uplink-downlink configuration to a user equipment covered by the network node device.

8. The method of claim 6, wherein the central node device manages at least one network node device, and the network node device or devices managed by the central node device is or are divided into at least one cluster, each of which includes at least one network node device; and the reference information further includes information about a cluster to which the network node device belongs; or
the reference information further includes geographical information of the network node device.

9. A network node device, comprising:
a processor, wherein:
the processor is configured to execute one or more computer readable program codes to perform:
obtaining a reference information for configuring an uplink-downlink configuration;
transmitting the reference information to a central node device managing the network node device; and
receiving information, about an uplink-downlink configuration, transmitted by the central node device;
wherein the reference information comprises a combination of at least one of following information and an utilization ratio of uplink sub-frames, an utilization ratio of downlink sub-frames of the network node device, and the user equipment;
wherein the following information comprises:
an amount of data to be transmitted in the uplink and the amount of data to be transmitted in the downlink of the network node device and/or the user equipment;
an amount of data to be transmitted in the uplink, the amount of data to be transmitted in the downlink, the amount of data transmitted in the uplink and the amount of data transmitted in the downlink of the network node device and/or the user equipment;
an ratio of needed uplink/downlink sub-frames of the network node device and/or the user equipment; and
a reference configuration information of uplink/downlink sub-frames of the network node device and/or the user equipment.

10. The network node device of claim 9, wherein the processor is configured to execute the one or more computer readable program codes to perform:
transmitting the information about the uplink-downlink configuration to a user equipment covered by the network node device.

11. The network node device of claim 9, wherein the central node device manages at least one network node device, and the network node device or devices managed by the central node device is or are divided into at least one cluster, each of which includes at least one network node device; and the reference information further includes information about a cluster to which the network node device belongs; or
the reference information further includes geographical information of the network node device.

* * * * *